(12) United States Patent
Mizrahy et al.

(10) Patent No.: US 8,990,236 B2
(45) Date of Patent: Mar. 24, 2015

(54) METHOD, COMPUTER PRODUCT PROGRAM AND SYSTEM FOR ANALYSIS OF DATA

(75) Inventors: Moshe Mizrahy, Tel Aviv (IL); Ronen Golan, Rehovot (IL); Nadav Kenneth, Tel Aviv (IL)

(73) Assignee: Qrative Ltd., Tel Aviv (IL)

( * ) Notice: Subject to any disclaimer, the term of this patent is extended or adjusted under 35 U.S.C. 154(b) by 71 days.

(21) Appl. No.: 13/499,926

(22) PCT Filed: Oct. 8, 2010

(86) PCT No.: PCT/IB2010/054560
§ 371 (c)(1),
(2), (4) Date: Jul. 24, 2012

(87) PCT Pub. No.: WO2011/042889
PCT Pub. Date: Apr. 14, 2011

(65) Prior Publication Data
US 2012/0284301 A1    Nov. 8, 2012

Related U.S. Application Data

(60) Provisional application No. 61/278,578, filed on Oct. 9, 2009.

(51) Int. Cl.
*G06F 7/00* (2006.01)
*G06F 17/30* (2006.01)

(52) U.S. Cl.
CPC .............................. *G06F 17/30734* (2013.01)
USPC ....................................................... 707/759

(58) Field of Classification Search
USPC ....................................................... 707/759
See application file for complete search history.

(56) References Cited

U.S. PATENT DOCUMENTS

| 6,750,864 | B1 * | 6/2004 | Anwar | 345/440 |
| 2007/0022072 | A1 * | 1/2007 | Kao et al. | 706/45 |
| 2011/0196872 | A1 * | 8/2011 | Sims et al. | 707/740 |

* cited by examiner

*Primary Examiner* — Truong Vo
(74) *Attorney, Agent, or Firm* — Oren Reches (57) ABSTRACT

A system, computer program product and a system for analysis of data, the method includes: extracting a concise representation of a content a sample of a first dataset, wherein the extracting is executed without being mainly based on a-priory knowledge of a content of the sample of the first dataset; querying a queried dataset using at least a portion of the concise representation of the content of the sample of the first dataset, to provide query results; and generating a concise representation of a content of the query results.

57 Claims, 9 Drawing Sheets

FIG. 1

Extracting clusters of key subunits from the sample of the first dataset. 122

Selecting key subunits based on a relationship between a frequency of appearance of subunits in the sample of the first dataset and a frequency of appearance of the subunits in a language of the subunits. 124

Selecting up to a predefined number of key subunits that have a highest ratio between the frequency of appearance of the subunits in the sample of the first dataset and the frequency of appearance of the subunits in a language of the subunits. 126

Clustering the key subunits based on a Jensen Shannon distance. 128

Querying of the queried dataset using at least one cluster of key subunits, to provide query results. 132

Querying a queried dataset using multiple clusters of key subunits, to provide multiple query results; consolidating the multiple query results to provide a consolidated dataset; and extracting clusters of key subunits from the consolidated dataset. 134

Querying a deep web site that belongs to the queried dataset; wherein the deep web site comprises deep web content and surface web content. The querying of the deep web site may include exposing at least a portion of the deep web content by using a probing query; and querying the exposed deep web content using the at least one cluster of key subunits. 136

Generating a concise representation of the content of the query results and of the content of the sample of the first dataset. 142

Generating at least one group associative structure, wherein each group associative structure represents a content of a group of files. 144

METHOD, COMPUTER PRODUCT PROGRAM AND SYSTEM FOR ANALYSIS OF DATA

RELATED APPLICATIONS

This application claims priority from U.S. patent provisional patent Ser. No. 61/278,578, filing date Oct. 9, 2009.

BACKGROUND OF THE INVENTION

A meaningful investigation of unknown, unstructured datasets is still an unresolved issue. By and large in order to intelligently investigate unstructured datasets one needs to hold, in one way or the other a knowledge base of some sort (either knowledge of the world, logical structures, lexical dictionaries, etc.), or a set of rules, to lead the investigation.

There are two main difficulties one need to overcome required to automatically investigate an unstructured dataset: (1) how to apply the appropriate knowledge base when the dataset is unknown; (2) the dataset is known but the knowledge base is incomplete or obsolete.

SUMMARY

According to an embodiment of the invention a computer implemented method for analysis of data is provided. The method may include extracting a concise representation of a content a sample of a first dataset, wherein the extracting is executed without being mainly based on a-priory knowledge of the content of the sample of the first dataset; querying a queried dataset using at least a portion of the concise representation of the content of the sample of the first dataset, to provide query results; and generating a concise representation of a content of the query results.

The extracting of the concise representation may include extracting clusters of key subunits from the sample of the first dataset, and wherein the querying of the queried dataset may include using at least one cluster of key subunits, to provide query results.

The method may include selecting key subunits based on a relationship between a frequency of appearance of subunits in the sample of the first dataset and a frequency of appearance of the subunits in a language of the subunits.

The method may include selecting up to a predefined number of key subunits that have a highest ratio between the frequency of appearance of the subunits in the sample of the first dataset and the frequency of appearance of the subunits in a language of the subunits.

The method may include clustering the key subunits based on a Jensen Shannon distance.

The method may include extracting the key subunits by an extraction module; querying the queried dataset by a query module; and generating the concise representation by concise representation generator.

The method may include querying a deep web site that belongs to the queried dataset; wherein the deep web site may include deep web content and surface web content; wherein the querying of the deep web site may include exposing at least a portion of the deep web content by using a probing query; and querying the exposed deep web content using the at least one cluster of key subunits.

The probing query may consist of at least one highly popular word.

The method further may include querying a queried dataset using multiple clusters of key subunits, to provide multiple query results; consolidating the multiple query results to provide a consolidated dataset; and extracting clusters of key subunits from the consolidated dataset.

The method may include generating a concise representation of the content of the query results and of the content of the sample of the first dataset.

The concise representation of the query results is an associative data structure.

The query results may include at least one group of files; and wherein the generating of the concise representation may include generating at least one group associative structure, wherein each group associative structure represents a content of a group of files.

The method may include repeating the stages of extracting, querying and generating at different points in time to provide multiple concise representations of the queried dataset at different points in time and comparing between the multiple concise representations obtained at the different points in time.

The method may include generating the first dataset by monitoring documents retrieved by a user.

The method may include generating multiple concise representations of the first dataset, and querying the queried dataset using at least a portion of each of the multiple concise representations of the first dataset to provide query results.

The method may include querying the queried dataset using at least a combination of at least a portion of at least two different concise representations of the first dataset to provide query results.

The method may include generating multiple sets of clusters key subunits of the first dataset, and querying the queried dataset using at least a portion of each set of the clusters of key subunits to provide query results.

The method may include querying the queried dataset using at least a combination of clusters key subunits of different sets to provide query results.

The method may include consolidating the multiple query results to provide a consolidated dataset; and generating a concise representation of the consolidated dataset.

The method may include generating a concise representation of each query result; and clustering the concise representations of the multiple query result.

The method may include consolidating the multiple query results to provide a consolidated dataset; and generating a concise representation of the consolidated dataset.

The method may include generating a concise representation of each query result; and clustering the concise representations of the multiple query result.

According to an embodiment of the invention a computer program product may be provided and may include a non-tangible computer readable medium that stores instructions for: extracting a concise representation of a content of a sample of a first dataset, wherein the extracting is executed without being mainly based on a-priory knowledge of a content of the sample of the first dataset; querying a queried dataset using at least a portion of the concise representation of the sample of the first dataset, to provide query results; and generating a concise representation of a content of the query results.

The non-tangible computer readable medium may store instructions for extracting of the concise representation by extracting clusters of key subunits from at least a sample of a first dataset, and querying of the queried dataset may include by using at least one cluster of key subunits, to provide query results.

The non-tangible computer readable medium may store instructions for selecting key subunits based on a relationship between a frequency of appearance of subunits in the sample of the first dataset and a frequency of appearance of the subunits in a language of the subunits.

The non-tangible computer readable medium may store instructions for selecting up to a predefined number of key subunits that have a highest ratio between the frequency of appearance of the subunits in the sample of the first dataset and the frequency of appearance of the subunits in a language of the subunits.

The non-tangible computer readable medium may store instructions for clustering the key subunits based on a Jensen Shannon distance.

The non-tangible computer readable medium may store instructions for extracting the key subunits by an extraction module; querying the queried dataset by a query module; and generating the concise representation by concise representation generator.

The non-tangible computer readable medium may store instructions for querying a deep web site that belongs to the queried dataset; wherein the deep web site may include deep web content and surface web content; wherein the querying of the deep web site may include: exposing at least a portion of the deep web content by using a probing query; and querying the exposed deep web content using the at least one cluster of key subunits.

The non-tangible computer readable medium may store instructions for using a probing query that consists of at least one highly popular word.

The non-tangible computer readable medium may store instructions for querying a queried dataset using multiple clusters of key subunits, to provide multiple query results; consolidating the multiple query results to provide a consolidated dataset; and extracting clusters of key subunits from the consolidated dataset.

The non-tangible computer readable medium may store instructions for generating a concise representation of the content of the query results and of the content of the sample of the first dataset.

The non-tangible computer readable medium may store instructions for generating the concise representation by generating at least one group associative structure, wherein each group associative structure represents a content of a group of files.

The non-tangible computer readable medium may store instructions for repeating the stages of extracting, querying and generating at different points in time to provide multiple concise representations of the queried dataset at different points in time and comparing between the multiple concise representations obtained at the different points in time.

The non-tangible computer readable medium may store instructions for generating the first dataset by monitoring documents retrieved by a user.

The non-tangible computer readable medium may store instructions for generating multiple concise representations of the first dataset, and querying the queried dataset using at least a portion of each of the multiple concise representations of the first dataset to provide query results.

The non-tangible computer readable medium may store instructions for querying the queried dataset using at least a combination of at least a portion of at least two different concise representations of the first dataset to provide query results.

The non-tangible computer readable medium may store instructions for generating multiple sets of clusters key subunits of the first dataset, and querying the queried dataset using at least a portion of each set of the clusters of key subunits to provide query results.

The non-tangible computer readable medium may store instructions for querying the queried dataset using at least a combination of clusters key subunits of different sets to provide query results.

The non-tangible computer readable medium may store instructions for consolidating the multiple query results to provide a consolidated dataset; and generating a concise representation of the consolidated dataset.

The non-tangible computer readable medium may store instructions for generating a concise representation of each query result; and clustering the concise representations of the multiple query result.

The non-tangible computer readable medium may store instructions for consolidating the multiple query results to provide a consolidated dataset; and generating a concise representation of the consolidated dataset.

The non-tangible computer readable medium may store instructions for generating a concise representation of each query result; and clustering the concise representations of the multiple query result.

According to an embodiment a system may be provided. The system may include: a query module arranged to query a queried dataset using at least a portion of a concise representation of a content of at least a sample of a first dataset, to provide query results; a memory module for storing the query results; and an extraction module arranged to: extract a concise representation of a content of the sample of a first dataset, wherein the extraction module is arranged to extract the concise representation of the content of the sample of the first dataset without a-priory knowledge of a content of the sample of the first dataset; and generate a concise representation of a content of the query results.

The extraction module may be arranged to extract clusters of key subunits of the sample of the first dataset that form the concise representation of the content of the sample of the first dataset.

The system may be arranged to select key subunits based on a relationship between a frequency of appearance of subunits in the sample of the first dataset and a frequency of appearance of the subunits in a language of the subunits.

The system may be arranged to select up to a predefined number of key subunits that have a highest ratio between the frequency of appearance of the subunits in the sample of the first dataset and the frequency of appearance of the subunits in a language of the subunits.

The system may be arranged to cluster the key subunits based on a Jensen Shannon distance.

The system may be arranged to extract the key subunits by an extraction module; querying the queried dataset by a query module; and generating the concise representation by concise representation generator.

The system may be arranged to query a deep web site that belongs to the queried dataset; wherein the deep web site may include deep web content and surface web content; may be arranged to query the deep web site by exposing at least a portion of the deep web content by using a probing query; and querying the exposed deep web content using the at least one cluster of key subunits.

The system may be arranged to use a probing query that consists of at least one highly popular word.

The system may be arranged to query a queried dataset using multiple clusters of key subunits, to provide multiple query results; consolidate the multiple query results to provide a consolidated dataset; and extract clusters of key subunits from the consolidated dataset.

The system may be arranged to generate a concise representation of the content of the query results and of the content of the sample of the first dataset.

The query results may include at least one group of files; and the system may be arranged to generate a concise representation that may include at least one group associative structure, wherein each group associative structure represents a content of a group of files.

The system may be arranged to repeat an extraction of a concise representation of the content of the sample of the first dataset, a query of the queried dataset and a generation of the concise representation of the content of the query results query a queried dataset at different points in time to provide multiple concise representations of the queried dataset at different points in time and to compare between the multiple concise representations obtained at the different points in time.

The system may be arranged to generate the first dataset by monitoring documents retrieved by a user.

The system may be arranged to generate multiple concise representations of the first dataset, and querying the queried dataset using at least a portion of each of the multiple concise representations of the first dataset to provide query results.

The system may be arranged to query the queried dataset using at least a combination of at least a portion of at least two different concise representations of the first dataset to provide query results.

The system may be arranged to generate multiple sets of clusters key subunits of the first dataset, and querying the queried dataset using at least a portion of each set of the clusters of key subunits to provide query results.

The system may be arranged to query the queried dataset using at least a combination of clusters key subunits of different sets to provide query results.

The system may be arranged to consolidate the multiple query results to provide a consolidated dataset; and generate a concise representation of the consolidated dataset.

The system may be arranged to generate a concise representation of each query result; and cluster the concise representations of the multiple query result.

The system may be arranged to consolidate the multiple query results to provide a consolidated dataset; and generate a concise representation of the consolidated dataset.

The system may be arranged to generate a concise representation of each query result; and cluster the concise representations of the multiple query result.

The key subunits may be nucleotides.

The aggregate size of the clusters of key subunits may be smaller than a size of the sample of a first dataset; and wherein a size of the concise representation of the content of the query results may be smaller than an aggregate size of documents that form the query results.

The concise representation of the content of the query results may be an ontology.

The concise representation of the content of the query results may be a vertical ontology.

The queried dataset may differ from the first dataset.

The queried dataset may be the first dataset.

BRIEF DESCRIPTION OF THE PRESENT INVENTION

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

DETAILED DESCRIPTION OF THE PRESENT INVENTION

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The method, computer program product and system may be used for self learning and may facilitate an intelligent investigation of unknown unstructured datasets in real-time or close to real-time.

The method, computer program product and system allow to generate an Ontology from an unknown dataset.

A dataset is one or more data structure that includes data. The dataset can have any form and can include data structures of different shape and size.

When an unknown dataset needs to be investigated, one cannot rely on prior knowledge to lead the investigation. First, since the dataset is unknown, the prior knowledge may not fit the data at hand. Second, an unstructured dataset holds information that can be looked at and understood from numerous varying angles. When leading the investigation with prior knowledge, one, by definition, will find in the new data only the structures and connections that exist in the prior knowledge (i.e. what he already knows). On the other hand, when investigating an unknown dataset without prior knowledge, one does not hold enough information to properly and faithfully analyze the data.

In order to overcome these obstacles the method, computer program and system can initially extract initial structures (such as clusters of key subunits) from a sample of the first dataset. The sample can be selected in a random manner, in a pseudo-random manner, according to predefined deterministic rules or a combination thereof. These initial structures can be referred to as "Ad-Hoc Ontologies". These initial structures represent the sample of the dataset mentioned, and can be used as actual relevant knowledge for further analysis of the dataset.

These initial structures can be used to further query a queried dataset that can be the first dataset, another dataset or a combination thereof. The queried dataset can include a portion of the first dataset and a portion of the other dataset.

These queries can be used to extract additional relevant information and this extracted additional relevant information can be used for various purposes such as to enrich the initial structures and generate a concrete model that will faithfully represent the dataset at hand.

According to an embodiment of the invention, an initial ontology can be used to generate automated queries to obtain additional relevant information from the queried dataset. The additional relevant information can be used to enrich the initial ontology and make it more relevant or updated.

According to an embodiment of the invention the initial associative structures can be used to query other datasets (i.e. the World Wide Web, or other datasets) in order to extract logical and associative concrete structures. The logical and associative concrete structures may assist in analyzing and researching the first dataset.

The method, system and computer program product may perform the analysis of data without prior knowledge of the content of the first dataset, and can be executed without manual intervention, or semi-automatic intervention for its investigation and analysis.

The method, system and computer program product may perform the analysis of data and determine whether a sample of the dataset holds enough information to generate a proper coherent model for exploring the queried dataset, and automatically search for relevant information from additional sources.

The method, system and computer program produce can automatically and even repetitively provide queries and query datasets to provide concise representation of a content of the query results. This concise representation can be used to enrich representations of datasets generated by other methods or systems. For example, other systems may store Ontologies of various types (even types that differ from the Ontologies generated by the method, system and the computer program product) that may be used to answer questions or analyze specific data or do classifications. These other systems sometime do not hold the answer, or the ability to classify a document since they don't have enough information. The suggested system, method and computer program product can retrieve relevant information (query results, concise representation of the query results) that can enrich their Ontologies. By generating an automated querying capability and repetitively retrieving relevant documents any representation of the queried dataset can be enriched and updated in a seamless manner.

By electing relatively small samples of a dataset and generating concise representations of the queried dataset the methods can be executed in real-time or close to real-time on large datasets.

According to an embodiment of the invention a method is provided. This method can be executed by a computer that executed instructions stored in a non-tangible computer readable medium.

The method may start by a first stage of extracting key subunits from a sample of a dataset. The dataset can be a textual dataset, a biological dataset, an electrophysiological dataset and the like. Other types of datasets or a combination thereof can be provided. Textual dataset can be (or can include) papers, articles, conversation sessions like blogs and forums over the internet, etc. Textual data can be of varying formats, such as HTML, XML, TXT, DOC, etc. Biological dataset can include one or more DNA sequences, one or more RNA sequences, and the like.

The dataset may include subunits. A subunit can be an atomic unit that forms the dataset but this is not necessarily so. For example, even subunits can be broken or segmented to smaller subunits. A text subunit can be a word, a phrase, a paragraph, multiple words, multiple phrases and the like. In biological dataset a subunit can be a nucleotide. In an electrophysiological dataset a subunit can be an electrical or magnetic value of each sample.

A key subunit is a subunit that is extracted from the sample of the dataset. It is expected that the extraction process will select subunits that include meaningful information, for example by filtering, rejecting or accepting subunits according to the frequency of their appearance.

The key subunits can be extracted by one or more methods including but not limited to frequency based methods. The least common subunits can be selected to be key subunits. This first stage can select up to a predefined number (n) of key subunits, select up to a predefined percentage (n %) of key subunits of all of the subunits, can select key subunits having a frequency based weight that is above predefined frequency base weight threshold, and the like.

The extraction of key subunits can include rejecting words that are not specific to a particular domain of interest such as but not limited to the most commonly used words in a language (such as "the", "a", "an", "if", "and" and the like).

The second stage of the method may include generating meaningful subgroups out of the key elements that were extracted by the first mentioned above stage. There are several methods for generating meaningful subgroups. These methods can apply clustering algorithms but this is not necessarily so. An example for such clustering can be seen in the following document which is incorporated herein by reference: N Slonim & N Tishby, (2000) "Document clustering using word clusters via the information bottleneck method", Annual ACM Conference on Research and Development in Information Retrieval.

The subgroups are meaningful in the sense that they are expected to reflect the content of the first dataset. Additionally or alternatively, they can be meaningful in the sense that the key subunits that may form a subgroup are linked or related to each other.

The third stage can include utilizing the meaningful subgroups. This may include at least one of the following: (a) Using the meaningful subgroups to analyze the entire repository (entire dataset); (b) Using the meaningful subgroups to extract a profile of a user—by monitoring the set of document a user is reading or retrieving or holds in his folders and generating a data structure (which may be Ontologies) and can represent the body of knowledge this user is interested in or his expertise. (c) Using the meaningful subgroups to extract types of interests of a user based on information retrieved by the user. (d) Using the subgroups generated in stage two to query, analyze and investigate, new, unknown datasets, (e) Using the subgroups generated in stage two to query vertically remote datasets (databases that hold information in a specific domain. e.g. medical information on cancer, diabetes etc.; patents of a specific class; and so on . . . ), importing the data and enriching a model (i.e. the ontology of a given domain) and/or a logical model for analyzing and researching the dataset at hand and other remote unknown datasets.

The third stage may include creating a single repository of the meaningful subgroups from numerous items in the dataset. This single repository can be divided into several associated groups in order to generate coherent themes across the entire dataset under investigation. These coherent themes can be used to analyze and classify (a) an additional data in the dataset, (b) New data added to the dataset, and even (c) new datasets from the same type.

The mentioned above method can be further explained by the non-limiting example of an analysis of a textual dataset. The method is aimed to generate a vertical ontology that captures information in a specific field of knowledge.

The method can start by a first stage of selecting a text that is a sample of a first dataset (for example—by retrieving a random text from a specific database), parsing the text by cleaning "stop list" (words that are not specific to a particular domain) words (e.g. "is", "are", "I", "you", "me" etc. . . . ), computing the frequency of appearances of each word in the sample, comparing the computed frequency in the text with its generic frequency in the language (e.g. in the English language for English texts), calculating the weight of each word in the text (frequency in the text divided by frequency in the language), and selecting the top n % (n is predefined) words with the highest weight, the top K (k is predefined) words, or the words that has a weight that exceeds a predefined threshold.

The method continues by a second stage of distance-based clustering the selected words using the Jensen Shannon Divergence method, for example as described by Slonim and Tishbi (2000) ibid. This provides clusters.

It is noted that the key subunits can be parsed stemmed and otherwise processed before being clustered or even after being clustered.

The method then proceeds by third stage of: (a) using each cluster from the previous stage as a query to send to the dataset at hand—the cluster can be a basis of a query of be provided as a query to a search engine, (b) processing each text from the results received by practicing the first and second stages to generate a repository of clusters, and (c) generating a hierarchical and/or associative and/or logical structure out of the clusters' repository (i.e. and Ontology). This stage (c) can include applying the first and second stages of the methods on the entire repository of texts retrieved from the data base at hand.

Figure 1:
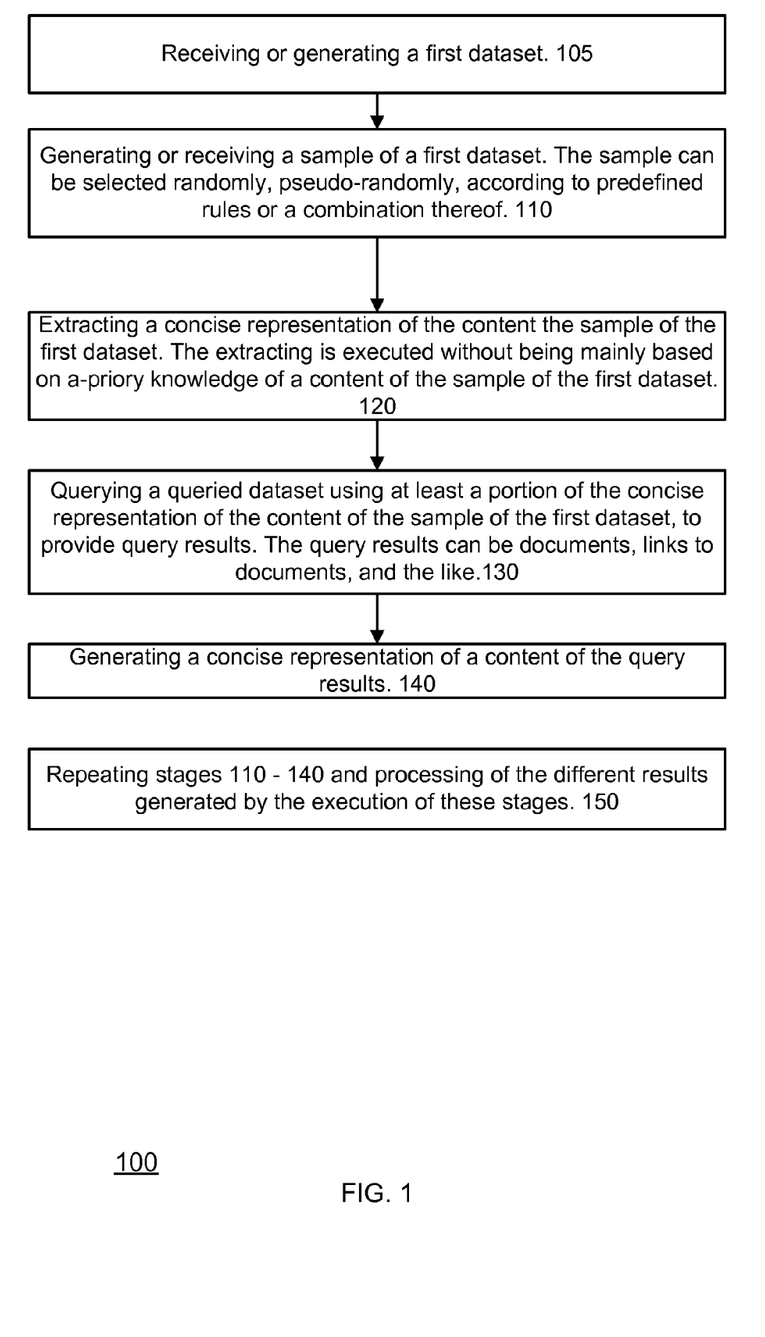
FIG. 1 illustrates a method according to an embodiment of the invention.

FIG. 1 illustrates a computer implemented method 100 for analysis of data, according to an embodiment of the invention.

Method 100 may start by stage 105.

Stage 105 may include receiving or generating a first dataset. Stage 105 may include generating the first dataset by monitoring documents retrieved by a user. Stage 105 may include receiving a link to a dataset. Stage 105 can include storing the first dataset or at least enabling access to the first dataset.

Stage 105 may be followed by stage 110 of generating or receiving a sample of a first dataset. The sample can be selected randomly, pseudo-randomly, according to predefined rules or a combination thereof.

Stage 110 may be followed by stage 120 of extracting a concise representation of the content the sample of the first dataset. The extracting is executed without being mainly based on a-priory knowledge of a content of the sample of the first dataset. Thus, stage 120 may include extracting the concise representation without using any a-priory knowledge about the content of the first dataset. In this sense the first dataset can be referred to as an unknown first dataset. It is noted that some knowledge of the content of the first dataset may exist (for example—its general topic) but in any case the extraction is not mainly based on such knowledge.

Stage 120 may be followed by stage 130 of querying a queried dataset using at least a portion of the concise representation of the content of the sample of the first dataset, to provide query results. The query results can be documents, links to documents, and the like. The querying can include providing at least one cluster of key subunits to a querying module such as a search engine. The querying module is expected to generate query results, wherein each cluster of key subunits can be used as a separate query.

The queried dataset can differ from the first dataset. These datasets can overlap but they can be non-overlapping. The first dataset and the queried dataset can differ by type, by extent, by format, by location of storage and the like. On the other hand the queried dataset can be the first dataset. In this case the clusters of key subunits will be used to query the first dataset itself.

Stage 130 may be followed by stage 140 of generating a concise representation of a content of the query results.

The concise representation of the query results can be a data structure of various types. It can be, for example an associative data structure, can be a logical data structure, can be an Ontology and even a vertical Ontology.

Stage 120 may be executed by an extraction module. Stage 130 may be executed by a query module. Stage 140 may be executed by a concise representation generator.

Figure 2:
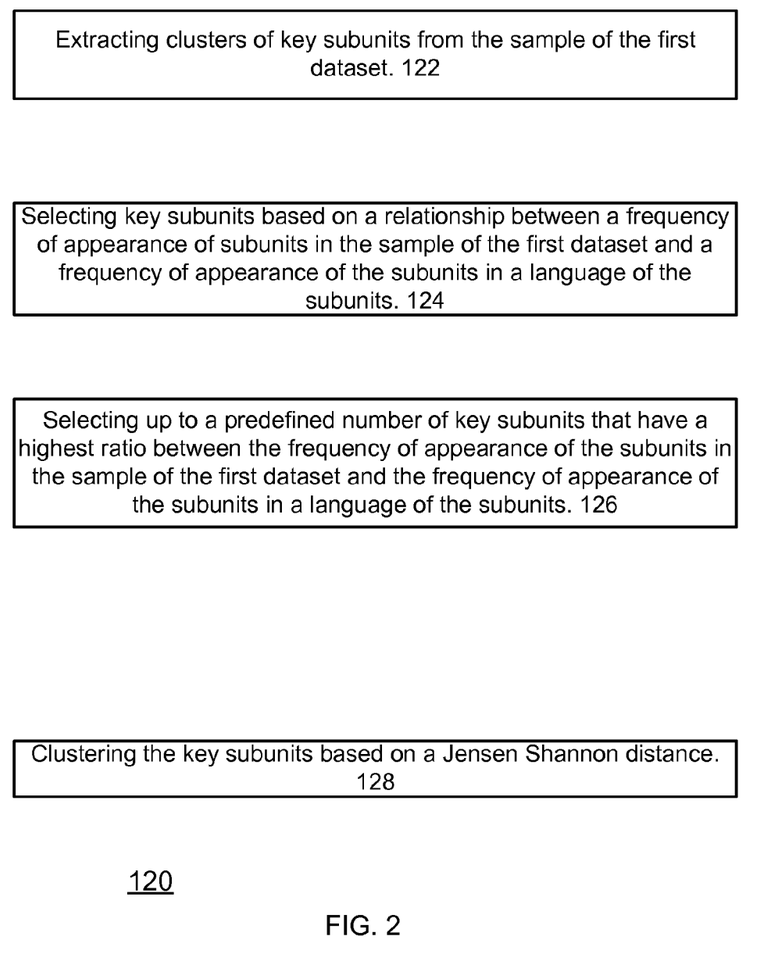
FIGS. 2-4 illustrate various stages of the method of FIG. 1, according to various embodiments of the invention.

Stage 120 may include either one of stages 122, 124, 126 and 128. These stages are illustrated in FIG. 2.

Stage 122 includes extracting clusters of key subunits from the sample of the first dataset. Stage 122 can include (a) determining the locations of the instances of appearance of each key subunit in the first dataset, (b) determining the similarities (distance) between the locations associated with different key subunits, and (c) clustering the key subunits based on these distances (similarities)—lower distances indicate of closer semantic relationships. Conveniently, stage 122 provided clusters of key subunits that are semantically associated to each other. Using clusters that include semantically associated key subunits increases the probability of receiving meaningful query results.

Stage 124 includes of selecting key subunits based on a relationship between a frequency of appearance of subunits in the sample of the first dataset and a frequency of appearance of the subunits in a language of the subunits.

Stage 126 includes selecting up to a predefined number of key subunits that have a highest ratio between the frequency of appearance of the subunits in the sample of the first dataset and the frequency of appearance of the subunits in a language of the subunits.

Stage 128 includes clustering the key subunits based on a Jensen Shannon distance.

Figure 3:
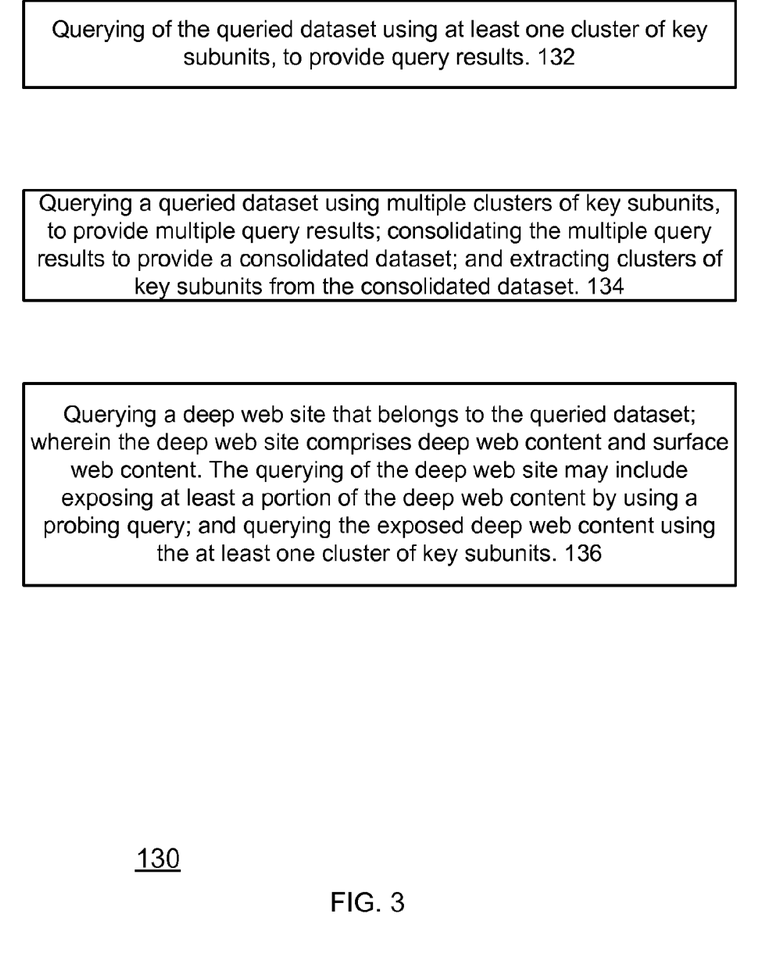

Stage 130 may include either one of stages 132, 134 and 136. These stages are illustrated in FIG. 3.

Stage 132 includes querying of the queried dataset using at least one cluster of key subunits, to provide query results.

Stage 134 includes querying a queried dataset using multiple clusters of key subunits, to provide multiple query results; consolidating the multiple query results to provide a consolidated dataset; and extracting clusters of key subunits from the consolidated dataset.

Stage 136 includes querying a deep web site that belongs to the queried dataset. The deep web site includes deep web content and surface web content. The surface web content is exposed to search engines such as standard search engines. The deep web content is not exposed to such search engines. The querying of the deep web site may include exposing at least a portion of the deep web content by using a probing query that generates deep web probing query results and querying the exposed deep web content (the deep web probing query results) using the at least one cluster of key subunits.

The probing query may consist of at least one highly popular word such as but not limited to a word that is rejected during stage 120. It may be a highly common word (such as but not limited to "the", "a", "an" and the like).

It is noted that the term concise indicates that an aggregate size of the clusters of key subunits is smaller (for example few percents or even fewer) than a size of the sample of a first dataset; and that a size of the concise representation of the content of the query results is smaller (for example few percents or even fewer) than an aggregate size of documents that form the query results.

Figure 4:
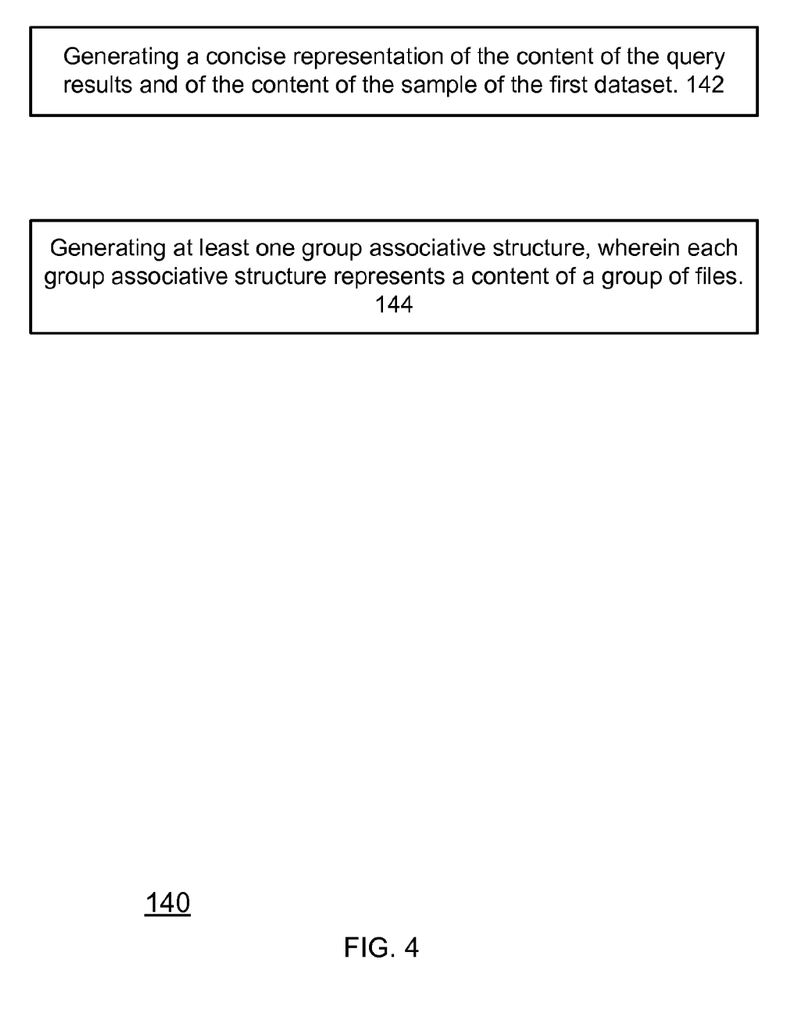

Stage 140 may include stages 142, 144 and 146 or a combination thereof. These stages are illustrated in FIG. 4.

Stage 142 may include generating a concise representation of the content of the query results and of the content of the sample of the first dataset.

The query results may include at least one group of files. A group of files can be an outcome of a query that uses a single cluster of subunits. Stage 144 may include generating at least one group associative structure, wherein each group associative structure represents a content of a group of files.

Stages 110, 120, 130 and 140 may be repeated multiple times to provide multiple concise representations of the queried dataset at different points in time. These multiple concise representations can be compared to each other in order to reveal updates, changes and the like. The queried dataset can change over time (documents can be added, deleted or amended, web sites can be added, deleted or amended and the like). These changes can be reflected by the repetition of stages 110-140 and a comparison (or other proceeding) of different outcomes of method 100. Stage 150 of FIG. 1 illustrates a repetition of stages 110-140 and a processing of the different results generated by the execution of these stages.

It is noted that various stages of method 140 can be repeated multiple times to generate the mentioned above concise representations of multiple dimensions. Each dimension can add connections (semantic relationship or relevancy) between key subunits or clusters of key subunits. For example, stage 120 can be executed multiple times (each time may be executed by applying different key subunit selection rules—such as changing the predefined number (or percent) of selected key subunits. Thus, in a first iteration of stage 120 a first set of key subunits are selected while in other iterations other sets of key subunits are selected.

Stage 120 can be followed by clustering the key subunits of each set to provide sets of clusters of key subunits. The association between clusters of key subunits of the first set and clusters of key subunits of the second set can be evaluated and data structures that represent these associations and these sets of clusters of key subunits can be generated.

Each cluster of key subunits and at least one or more combinations of clusters of key subunits of different sets can be used to provide query results.

The documents that are included in the query results (such as the top K documents) can undergo multiple iterations of stages 110-130 (can be treated as the first data sets) to provide a concise representation of the query results.

The method 100 may include generating multiple concise representations of the first dataset, and querying the queried dataset using at least a portion of each of the multiple concise representations of the first dataset to provide query results.

The method 100 may include querying the queried dataset using at least a combination of at least a portion of at least two different concise representations of the first dataset to provide query results.

The method may include generating multiple sets of clusters key subunits of the first dataset, and querying the queried dataset using at least a portion of each set of the clusters of key subunits to provide query results.

The method may include comprising querying the queried dataset using at least a combination of clusters key subunits of different sets to provide query results.

The method may include consolidating the multiple query results to provide a consolidated dataset; and generating a concise representation of the consolidated dataset.

The method may include generating a concise representation of each query result; and clustering the concise representations of the multiple query result.

Some of these mentioned above stages are illustrated in the following table.

The following table will illustrates the mentioned above example:

TABLE 1

| Stage | Outcome | remarks |
|---|---|---|
| 120 | Key subunits a, b, c, d, e, f | Selected top 6 key subunits of first dataset 310 |
| 120 | First set of clusters includes (a, b, c) and (d, e, f) | Clustering |
| 120 | Key subunits a, b, c, d, e, f, g, h, l, j | Selected top 10 key subunits of first dataset 310 |
| 120 | Second set clusters includes (a, b, d), (c, j), (e, f) and (g, h, i) | Clustering |
| 120 | Generate concise representation: [(a, b, c) - (a, b, d), (c, j), (e, f), (g, h, i)] [(d, e, f) - (e, f), (a, b, d), (c, j), (g, h, i)] | Generate concise representation of first and second sets - order of clusters indicative of the level of association between clusters that belong to different sets |
| 130 | Generating a query result using (a, b, c) as a query - QR(a, b, c) Generating a query result using (d, e, f) as a query - QR(d, e, f) Generating query result using consolidated combinations of clusters of different sets. For example - consolidating (a, b, c) and (a, b, d) to provide consolidated set (a, b, c, d) and using it as a query to generate QR(a, b, c, d). | Querying a queried dataset using clusters of key datasets and optionally combination of clusters from different sets |
| 110 | Extracting samples of each query result (each query result is treated as a first dataset) | Extracting samples from each of QR(a, b, c), QR(d, e, f), QR(c, j), QR(e, f), QR(g, h, i) and combinations or consolidates combinations of clusters of different sets. Alternatively, treating the aggregate of query results as a first dataset and applying stages 110 and 120 on the aggregate of query results. |
| 120 | Applying stage 120 on the samples to provide a concise representation of the query results. | The outcome can be a complex data structure (for example an ontology) that can represent multi-dimensional relationships between multiple key subunits and clusters of key subunits. |

Figure 5:
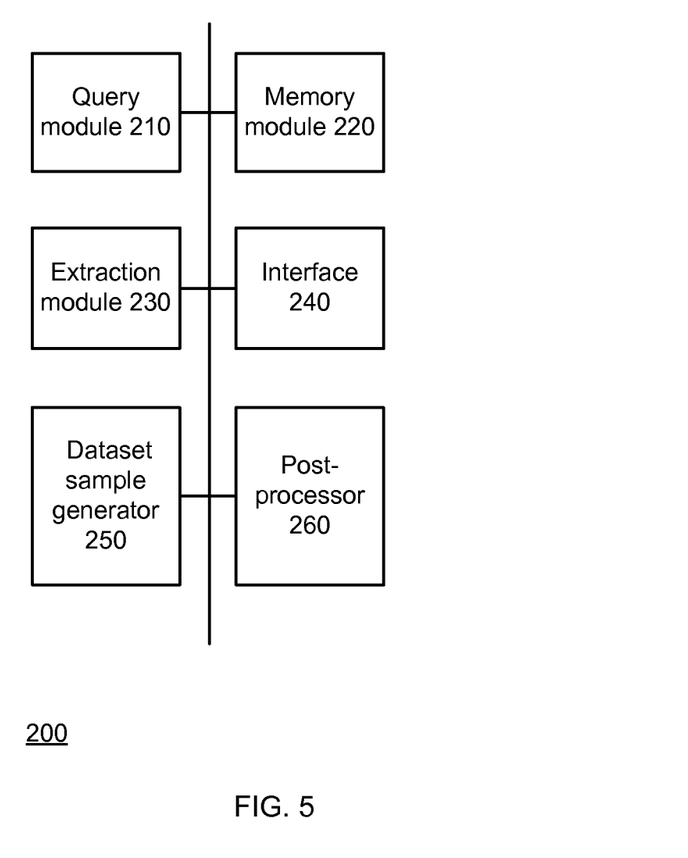
FIG. 5 illustrates a system according to an embodiment of the invention.

FIG. 5 illustrates a system 200 according to an embodiment of the invention.

System 500 includes: (i) a query module 210 arranged to query a queried dataset using at least a portion of a concise representation of a content of at least a sample of a first dataset, to provide query results; (ii) a memory module 220 for storing the query results and may also store additional information such as the sample of the first dataset; and (iii) an extraction module 230 arranged to: extract a concise representation of a content of the sample of a first dataset, wherein the extraction module is arranged to extract the concise representation of the content of the sample of the first dataset without a-priory knowledge of a content of the sample of the first dataset; and generate a concise representation of a content of the query results.

FIG. 5 illustrates system 200 as including an interface 240 for exchanging information. The interface may receive query results may allow access to networks, memory modules, databases, other systems and the like. The interface 240 can include one or more hardware elements such as a physical interface, ports. The interface 240 can include, additionally or alternatively, software components such as a browser, protocol stack and the like.

System 200 can include one or more processing circuits that can execute the functionalities of the query module 210, or (and) the extraction module 230. These processing circuits can be general purpose processors, digital signals processors and the like.

The extraction module 230 can be arranged to perform at least one of the following:

a. Extract a concise representation of the content the sample of the first dataset. The extracting is executed without being mainly based on a-priory knowledge of a content of the sample of the first dataset. Thus the extraction module 230 can operate without using any a-priory knowledge about the content of the first dataset. In this sense the first dataset can be referred to as an unknown dataset. It is noted that some knowledge of the content of the first dataset may exist (for example—its general topic) but in any case the extraction is not mainly based on such knowledge.

b. Extract clusters of key subunits from the sample of the first dataset.

c. Select key subunits based on a relationship between a frequency of appearance of subunits in the sample of the first dataset and a frequency of appearance of the subunits in a language of the subunits.

d. Select up to a predefined number of key subunits that have a highest ratio between the frequency of appearance of the subunits in the sample of the first dataset and the frequency of appearance of the subunits in a language of the subunits.

e. Cluster the key subunits based on a Jensen Shannon distance.

f. Generate a concise representation of a content of the query results.

g. Generate a concise representation that can be an associative data structure, an ontology, a vertical ontology and the like.

h. Generate a concise representation of the content of the query results and of the content of the sample of the first dataset.

i. Assuming that the query results may include at least one group of files and that a group of files can be an outcome of a query that uses a single cluster of subunits, then the extraction module 230 can be arranged to generate at least one group associative structure, wherein each group associative structure represents a content of a group of files.

The query module 210 can be arranged to perform at least one of the following:

j. Query a queried dataset using at least a portion of the concise representation of the content of the sample of the first dataset, to provide query results.

k. Query a queried dataset that differs from the first dataset.

l. Query a queried dataset that is the first dataset.

m. Query the queried dataset using at least one cluster of key subunits, to provide query results.

n. Querying a queried dataset using multiple clusters of key subunits, to provide multiple query results; consolidate the multiple query results to provide a consolidated dataset; and extract clusters of key subunits from the consolidated dataset.

o. Query a deep web site that belongs to the queried dataset; wherein the deep web site comprises deep web content and surface web content. The query of the deep web site may include an exposure at least a portion of the deep web content by using a probing query; and a querying of the exposed deep web content using the at least one cluster of key subunits.

p. Probe the deep web site by a probing query that consist of at least one highly popular word such as but not limited to a word that is rejected during stage 120, a highly common word (such as but not limited to "the", "a", "an" and the like).

System 200 can also include dataset sample generator 250 that can be arranged to generate a first dataset and, additionally or alternatively, generate a sample of a first dataset. The sample can be selected randomly, pseudo-randomly, according to predefined rules or a combination thereof. The dataset sample generator can generate the first dataset by monitoring information retrieved by a user.

System 200 can also include a post-processor 260 that is arranged to receive multiple concise representations of the queried dataset generated at different points in time and process these multiple concise representations. The processing can include, for example, comparing the multiple concise representations to each other in order to reveal updates, changes and the like. The queried dataset can change over time (documents can be added, deleted or amended, web sites can be added, deleted or amended and the like).

Figure 6:
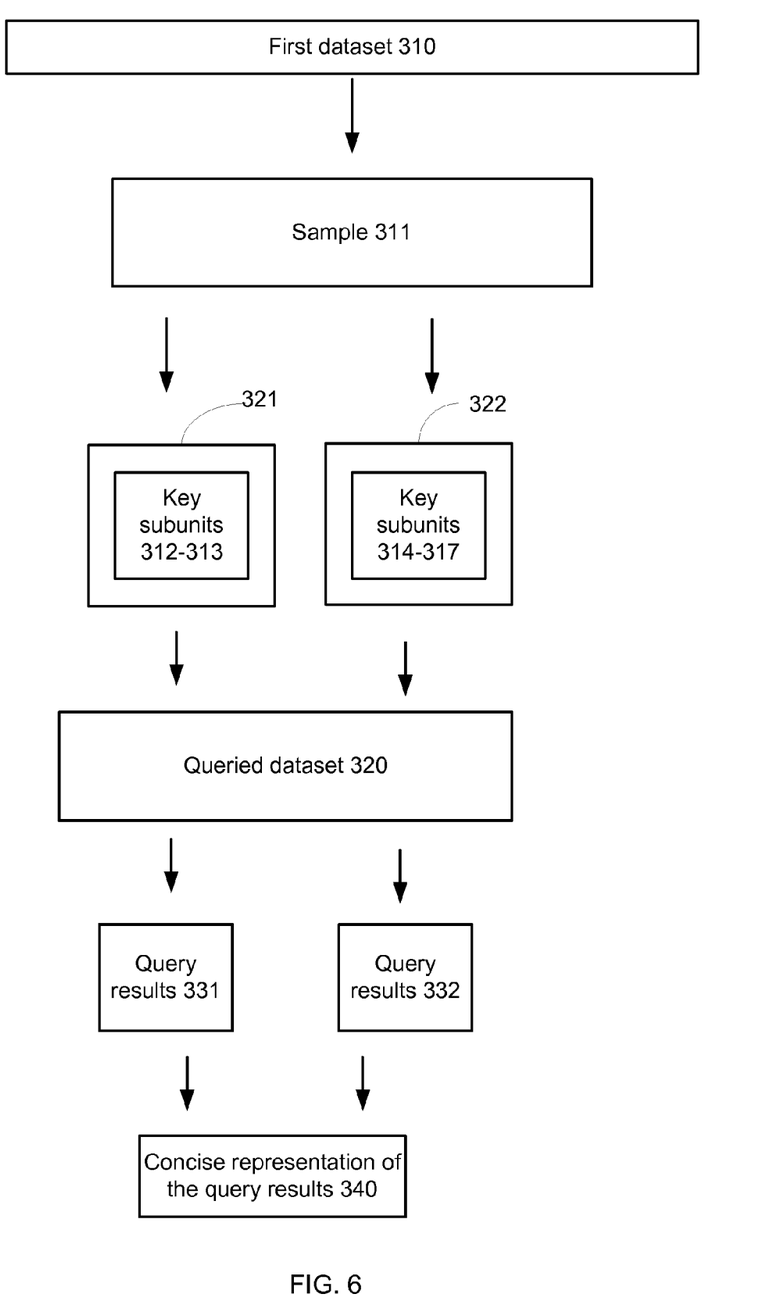
FIG. 6 illustrates various data structures according to an embodiment of the invention.

FIG. 6 illustrates various data structures according to an embodiment of the invention. These data structures include a first dataset 310, a sample 311 of the first dataset that includes key subunits 312-317, a queried dataset 320, a concise representation of the sample 311 such as key subunit clusters 321 and 322, query results 331 and 332 and a concise representation 340 of the query results 331 and 332.

Key subunits 312-313 belong to a first key subunit cluster 321 while key subunits 314-317 belong to a second key subunit cluster 322.

Query results 331 are the outcome of querying the queried dataset 320 with first key subunit cluster 321. Query results 332 are the outcome of querying the queried dataset 320 with second key subunit cluster 322.

The concise representation 340 of the query results 331 and 332 can be deemed as an Ontology if, for example they hold enough meaningful information. The ontology can include one or more sets of key subunits of the query results that are arranged according to their significance—starting from a main key subunit and further including other key subunit ordered by their association to the main key subunit.

The mentioned above method and system can be further illustrated by the following example. In the world of medicine (as in other worlds) there are numerous conceptual gaps and terminologies either between professionals and non-professional, or even among professionals from different domains.

These conceptual gaps manifest themselves, among others, in social networks where heterogeneity of users is high.

Method 100 and system 300 can bridge over these conceptual gaps and bring users, in these social networks, closer to each other and to information.

Method 100 and system 300 can bring to network users relevant information, even when it was not explicitly searched for. This will allow suggesting professional information to non-professionals on the one hand, and suggesting professional (i.e. scientific papers and articles) and non-professional information (i.e. blogs, questions, and personal experiences) to professionals (MDs and medical caretakers).

Method 100 and system 300 can implement a semantic engine. Referring to the example set forth in FIG. 5, the semantic engine can include the query module 210, interface 240 and the extraction module 230. The semantic engine can constantly analyze the information flowing in the social network and its owners and use such information either as the first dataset, the queried dataset or a portion of either one of these datasets. It is noted that the outcome of method 100 can be distributed over social networks.

Figure 7:
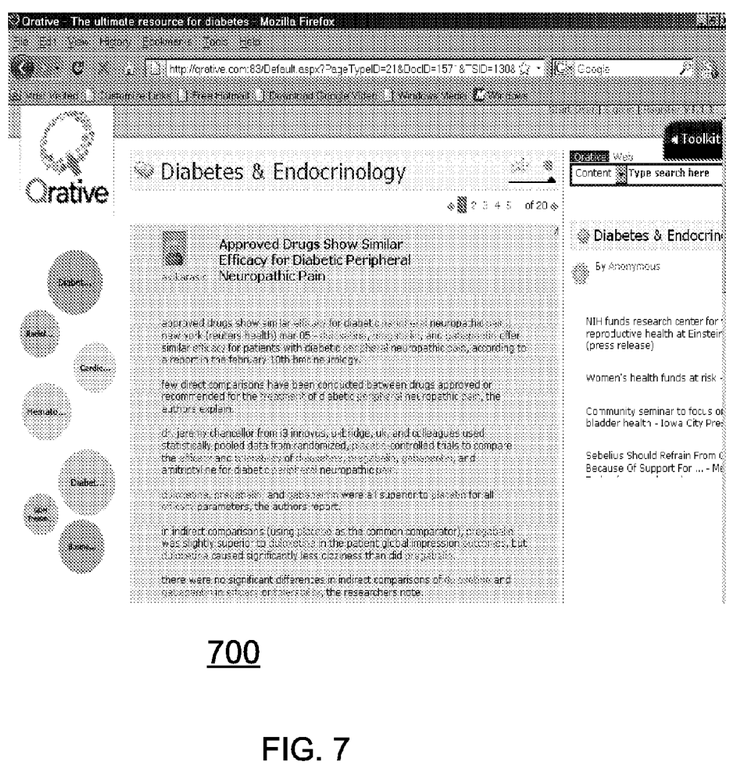
FIGS. 7-9 are snapshots of screens according to an embodiment of the invention.
Figure 8:
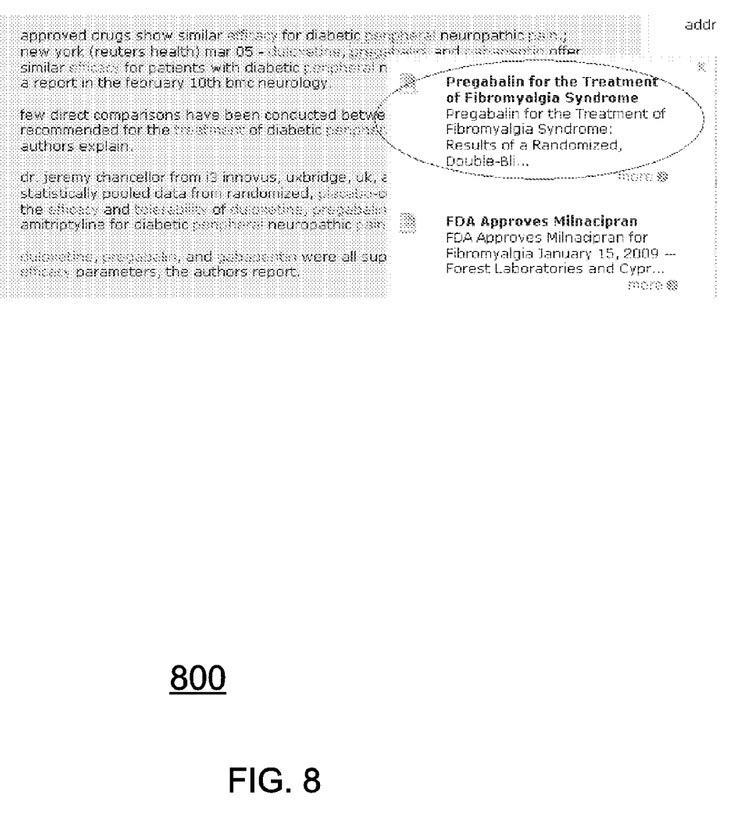
Figure 9:
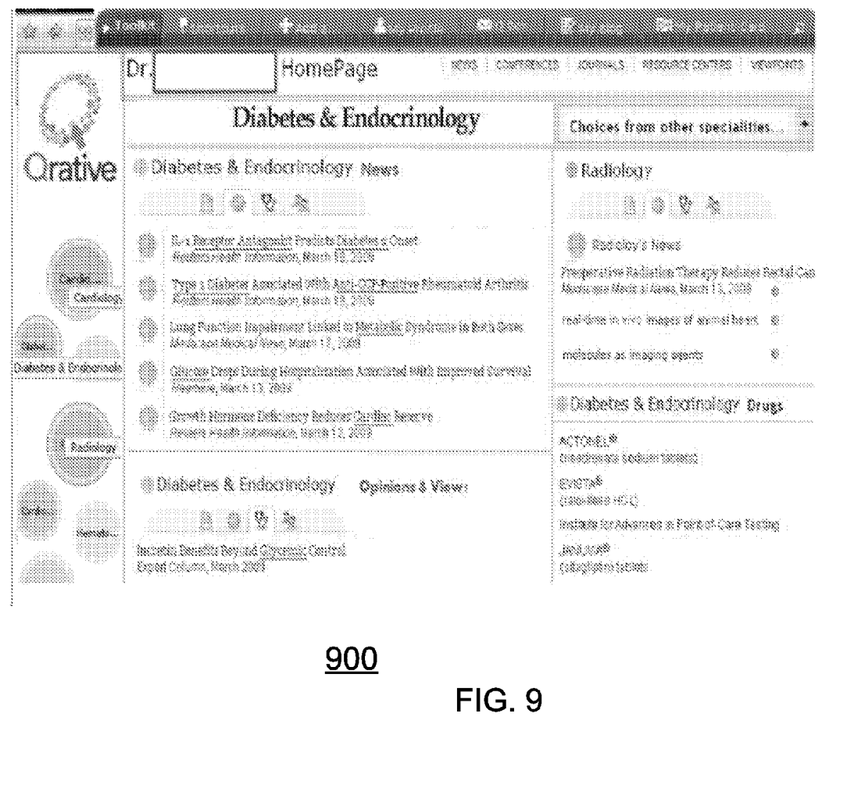

FIGS. 7-9 are snap shot of web pages 700, 800 and 900 according to an embodiment of the invention. FIG. 7 illustrates an article that is a first dataset and also illustrates key subunits that were extracted by executing stage 120—these key subunits are slightly highlighted. The article was published in a professional web site that is dedicated to topics such as diabetes and endocrinology.

These key subunits are utilized as queries to a larger queried datasets that may include additional web sites, including, for example radiology dedicated web sites or web pages. The outcome of method 100 can include multiple query results such as multiple documents, multiple links to these files and a concise representation of the queried dataset. This is illustrated in FIGS. 8 and 9. It is noted that the query results are not focused on solely the specific domain from which the first and second stages were derived. In the figure below one can see that even when the focus of interest of the user is Diabetes & Endocrinology the additional information comes from other domains such as Radiology.

The method 100 can be executed by a computer that executes instructions stored in a non-tangible computer readable medium of a computer program product such as a disk a diskette, a tape, a storage unit, a memory module and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A computer implemented method for analysis of data, the method comprising:
   extracting without manual intervention a concise representation of a content a sample of a first dataset, wherein the extracting is executed without being based on a-priory knowledge of the content of the sample of the first dataset;
   wherein the first dataset is either a biological dataset or a textual dataset;
   wherein when the first dataset is a biological dataset it comprises least one out of sequence out of a DNA sequence and a RNA sequence;
   wherein when the first dataset is a textual dataset then the sample of the first dataset comprises multiple words;
   querying without manual intervention a queried dataset using at least a portion of the concise representation of the content of the sample of the first dataset, to provide query results; and
   generating without manual intervention a concise representation of a content of the query results.

2. The method according to claim 1, wherein the extracting of the concise representation comprises extracting clusters of key subunits from the sample of the first dataset, and wherein the querying of the queried dataset comprises using at least one cluster of key subunits, to provide query results.

3. The method according to claim 2, comprising selecting key subunits based on a relationship between a frequency of appearance of subunits in the sample of the first dataset and a frequency of appearance of the subunits in a language of the subunits.

4. The method according to claim 3, comprising selecting up to a predefined number of key subunits that have a highest ratio between the frequency of appearance of the subunits in the sample of the first dataset and the frequency of appearance of the subunits in a language of the subunits.

5. The method according to claim 2, comprising clustering the key subunits based on a Jensen Shannon distance.

6. The method according to claim 2, comprising extracting the key subunits by an extraction module; querying the queried dataset by a query module; and generating the concise representation by concise representation generator.

7. The method according to claim 2, comprising querying a deep web site that belongs to the queried dataset; wherein the deep web site comprises deep web content and surface web content; wherein the surface web content is exposed to certain types of search engines and the deep web content is not exposed to certain types of search engines; wherein the querying of the deep web site comprises: exposing at least a portion of the deep web content by using a probing query; and querying the exposed deep web content using the at least one cluster of key subunits.

8. The method according to claim 7, wherein the probing query consists of at least one highly popular word.

9. The method according to claim 2, wherein the key subunits are nucleotides.

10. The method according to claim 2, further comprising querying a queried dataset using multiple clusters of key subunits, to provide multiple query results; consolidating the multiple query results to provide a consolidated dataset; and extracting clusters of key subunits from the consolidated dataset.

11. The method according to claim 2, wherein an aggregate size of the clusters of key subunits is smaller than a size of the sample of a first dataset; and wherein a size of the concise representation of the content of the query results is smaller than an aggregate size of documents that form the query results.

12. The method according to claim 1, comprising generating a concise representation of the content of the query results and of the content of the sample of the first dataset.

13. The method according to claim 1, wherein the concise representation of the query results is an associative data structure.

14. The method according to claim 1, wherein the query results comprise at least one group of files; and wherein the generating of the concise representation comprises generating at least one group associative structure, wherein each group associative structure represents a content of a group of files.

15. The method according to claim 1 wherein the concise representation of the content of the query results is an associative ontology.

16. The method according to claim 1, wherein the concise representation of the content of the query results is a vertical ontology.

17. The method according to claim 1, wherein the queried dataset differs from the first dataset.

18. The method according to claim 1, wherein the queried dataset is the first dataset.

19. The method according to claim 1, comprising repeating the stages of extracting, querying and generating at different points in time to provide multiple concise representations of the queried dataset at different points in time and comparing between the multiple concise representations obtained at the different points in time.

20. The method according to claim 1, comprising generating the first dataset by monitoring documents retrieved by a user.

21. The method according to claim 1, comprising generating multiple concise representations of the first dataset, and querying the queried dataset using at least a portion of each of the multiple concise representations of the first dataset to provide query results.

22. The method according to claim 21, further comprising querying the queried dataset using at least a combination of at least a portion of at least two different concise representations of the first dataset to provide query results.

23. The method according to claim 21, comprising generating multiple sets of clusters key subunits of the first dataset, and querying the queried dataset using at least a portion of each set of the clusters of key subunits to provide query results.

24. The method according to claim 23, further comprising querying the queried dataset using at least a combination of clusters key subunits of different sets to provide query results.

25. The method according to claim 21 further comprising consolidating the multiple query results to provide a consolidated dataset; and generating a concise representation of the consolidated dataset.

26. The method according to claim 21 comprising generating a concise representation of each query result; and clustering the concise representations of the multiple query result.

27. The method according to claim 1 further comprising consolidating the multiple query results to provide a consolidated dataset; and generating a concise representation of the consolidated dataset.

28. The method according to claim 1 comprising generating a concise representation of each query result; and clustering the concise representations of the multiple query result.

29. A computer program product that comprises a non-tangible computer readable medium that stores instructions for:
    extracting without manual intervention a concise representation of a content of a sample of a first dataset, wherein the extracting is executed without being based on a-priory knowledge of a content of the sample of the first dataset;
    wherein the first dataset is either a biological dataset or a textual dataset;
    wherein when the first dataset is a biological dataset it comprises least one out of sequence out of a DNA sequence and a RNA sequence;
    wherein when the first dataset is a textual dataset then the sample of the first dataset comprises multiple words;
    querying without manual intervention a queried dataset using at least a portion of the concise representation of the sample of the first dataset, to provide query results; and
    generating without manual intervention a concise representation of a content of the query results.

30. The computer program product according to claim 29, wherein the non-tangible computer readable medium stores instructions for extracting of the concise representation by extracting clusters of key subunits from at least a sample of a first dataset, and querying of the queried dataset comprises by using at least one cluster of key subunits, to provide query results.

31. The computer program product according to claim 30, wherein the non-tangible computer readable medium stores instructions for selecting key subunits based on a relationship between a frequency of appearance of subunits in the sample of the first dataset and a frequency of appearance of the subunits in a language of the subunits.

32. The computer program product according to claim 31, wherein the non-tangible computer readable medium stores instructions for selecting up to a predefined number of key subunits that have a highest ratio between the frequency of appearance of the subunits in the sample of the first dataset and the frequency of appearance of the subunits in a language of the subunits.

33. The computer program product according to claim 30, wherein the non-tangible computer readable medium stores instructions for clustering the key subunits based on a Jensen Shannon distance.

34. The computer program product according to claim 30, wherein the non-tangible computer readable medium stores instructions for extracting the key subunits by an extraction module; querying the queried dataset by a query module; and generating the concise representation by concise representation generator.

35. The computer program product according to claim 30, wherein the non-tangible computer readable medium stores instructions for querying a deep web site that belongs to the queried dataset; wherein the deep web site comprises deep web content and surface web content; wherein the surface web content is exposed to certain types of search engines and the deep web content is not exposed to certain types of search engines; wherein the querying of the deep web site comprises: exposing at least a portion of the deep web content by using a probing query; and querying the exposed deep web content using the at least one cluster of key subunits.

36. The computer program product according to claim 35, wherein the non-tangible computer readable medium stores instructions for using a probing query that consists of at least one highly popular word.

37. The computer program product according to claim 30, wherein the key subunits are nucleotides.

38. The computer program product according to claim 30, wherein the non-tangible computer readable medium stores instructions for querying a queried dataset using multiple clusters of key subunits, to provide multiple query results; consolidating the multiple query results to provide a consolidated dataset; and extracting clusters of key subunits from the consolidated dataset.

39. The computer program product according to claim 30, wherein an aggregate size of the clusters of key subunits is smaller than a size of the sample of a first dataset; and wherein a size of the concise representation of the content of the query results is smaller than an aggregate size of documents that form the query results.

40. The computer program product according to claim 29, wherein the non-tangible computer readable medium stores instructions for generating a concise representation of the content of the query results and of the content of the sample of the first dataset.

41. The computer program product according to claim 29, wherein the concise representation of the query results is an associative data structure.

42. The computer program product according to claim 29, wherein the query results comprise at least one group of files; and wherein the non-tangible computer readable medium stores instructions for generating the concise representation by generating at least one group associative structure, wherein each group associative structure represents a content of a group of files.

43. The computer program product according to claim 29, wherein the concise representation of the content of the query results is an associative ontology.

44. The computer program product according to claim 29, wherein the concise representation of the content of the query results is a vertical ontology.

45. The computer program product according to claim 29, wherein the queried dataset differs from the first dataset.

46. The computer program product according to claim 29, wherein the queried dataset is the first dataset.

47. The computer program product according to claim 29, wherein the non-tangible computer readable medium stores instructions for repeating the stages of extracting, querying and generating at different points in time to provide multiple concise representations of the queried dataset at different points in time and comparing between the multiple concise representations obtained at the different points in time.

48. The computer program product according to claim 29, wherein the non-tangible computer readable medium stores instructions for generating the first dataset by monitoring documents retrieved by a user.

49. The computer program product according to claim 29, wherein the non-tangible computer readable medium stores instructions for generating multiple concise representations of the first dataset, and querying the queried dataset using at least a portion of each of the multiple concise representations of the first dataset to provide query results.

50. The computer program product according to claim 49, wherein the non-tangible computer readable medium stores instructions for querying the queried dataset using at least a combination of at least a portion of at least two different concise representations of the first dataset to provide query results.

51. The computer program product according to claim 49, wherein the non-tangible computer readable medium stores instructions for generating multiple sets of clusters key subunits of the first dataset, and querying the queried dataset using at least a portion of each set of the clusters of key subunits to provide query results.

52. The computer program product according to claim 49, wherein the non-tangible computer readable medium stores instructions for querying the queried dataset using at least a combination of clusters key subunits of different sets to provide query results.

53. The computer program product according to claim 49, wherein the non-tangible computer readable medium stores instructions for consolidating the multiple query results to provide a consolidated dataset; and generating a concise representation of the consolidated dataset.

54. The computer program product according to claim 49, wherein the non-tangible computer readable medium stores instructions for generating a concise representation of each query result; and clustering the concise representations of the multiple query result.

55. The computer program product according to claim 29, wherein the non-tangible computer readable medium stores instructions for consolidating the multiple query results to provide a consolidated dataset; and generating a concise representation of the consolidated dataset.

56. The computer program product according to claim 29, wherein the non-tangible computer readable medium stores instructions for generating a concise representation of each query result; and to cluster the concise representations of the multiple query result.

57. A system, comprising:
a query module arranged to query without manual intervention a queried dataset using at least a portion of a concise representation of a content of at least a sample of a first dataset, to provide query results;
a memory module for storing the query results; and
an extraction module arranged to:
extract without manual intervention a concise representation of a content of the sample of a first dataset, wherein the extraction module is arranged to extract the concise representation of the content of the sample of the first dataset without a-priory knowledge of a content of the sample of the first dataset;
wherein the first dataset is either a biological dataset or a textual dataset;
wherein when the first dataset is a biological dataset it comprises least one out of sequence out of a DNA sequence and a RNA sequence;
wherein when the first dataset is a textual dataset then the sample of the first dataset comprises multiple words; and
generate without manual intervention a concise representation of a content of the query results.

* * * * *